Dec. 25, 1956   R. G. TILLOU   2,775,353
SHOCK ABSORBING MECHANISM FOR RAILWAY CARS
Filed Dec. 13, 1952   3 Sheets-Sheet 1
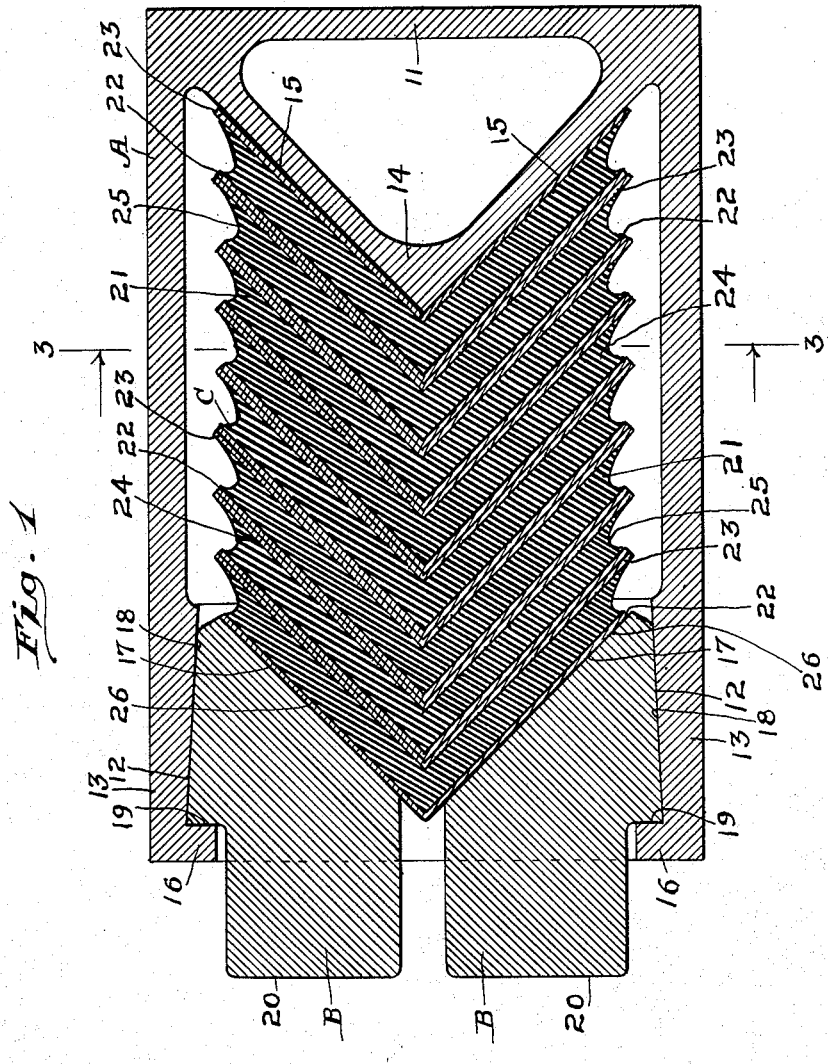
Inventor:
Richard G. Tillou.
By Henry Fuchs
Atty.

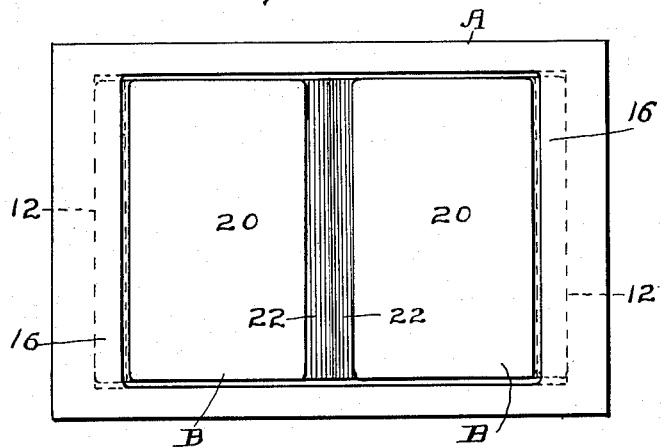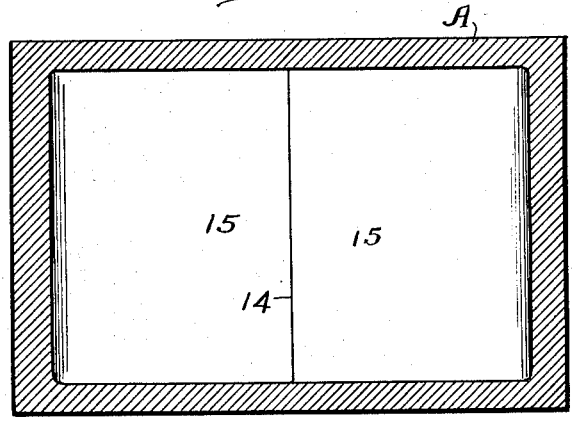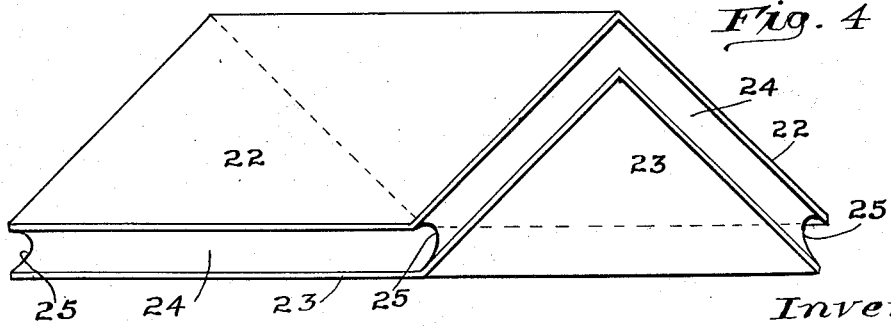

Dec. 25, 1956 R. G. TILLOU 2,775,353
SHOCK ABSORBING MECHANISM FOR RAILWAY CARS
Filed Dec. 13, 1952 3 Sheets-Sheet 3
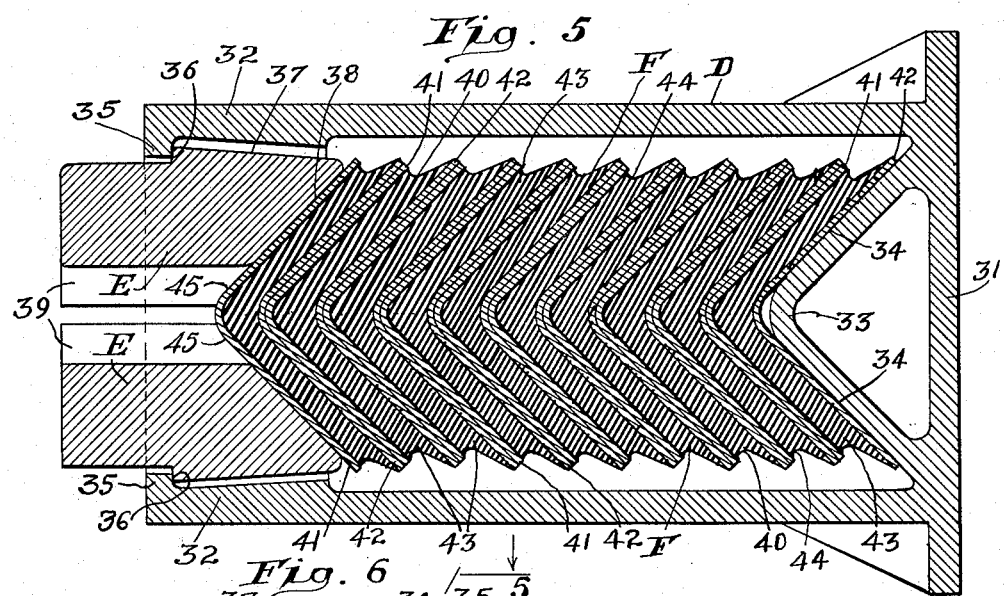
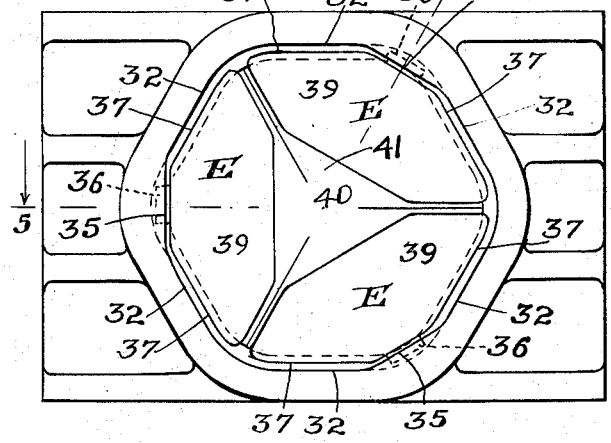
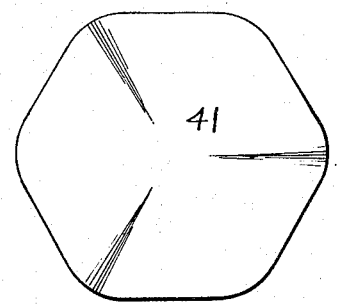
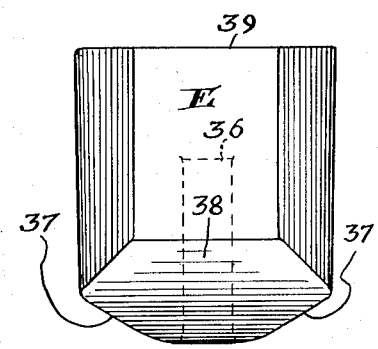
Inventor:
Richard G. Tillou.
By Henry Fuchs
Atty.

United States Patent Office 2,775,353
Patented Dec. 25, 1956

2,775,353

SHOCK ABSORBING MECHANISM FOR RAILWAY CARS

Richard G. Tillou, Lombard, Ill., assignor to W. H. Miner, Inc., Chicago, Ill., a corporation of Delaware Application December 13, 1952, Serial No. 325,783

7 Claims. (Cl. 213—34)

This invention relates to improvements in friction shock absorbing mechanisms for draft riggings of railway cars.

One object of the invention is to provide a high capacity friction shock absorbing mechanism, comprising a friction casing, and yieldingly resisted friction shoes slidingly telescoped within the casing, wherein the yielding resistance to movement of the shoes is provided by a cushioning element composed of a plurality of units arranged in series, and each unit composed of a rubber mat and a pair of metal plates embracing the mat at the front and rear sides thereof, and to which the mat is vulcanized, wherein the shoes bear directly on the cushioning element and the latter is shaped to wedge the shoes apart into tight frictional engagement with the longitudinal interior walls of the casing.

A more specific object of the invention is to provide a mechanism as set forth in the preceding paragraph wherein the rubber mat and the plates of each unit of the cushioning element are each composed of sections which converge forwardly of the mechanism toward the central longitudinal axis thereof, to present a spreading member of wedge-shaped formation.

Other objects of the invention will more clearly appear from the description and claims hereinafter following.

In the accompanying drawings forming a part of this specification,

Figure 1 is a horizontal longitudinal sectional view of my improved friction shock absorbing mechanism.

Figure 2 is a front elevational view of the improved mechanism, looking from left to right in Figure 1.

Figure 3 is a transverse vertical sectional view, corresponding substantially to the line 3—3 of Figure 1, with the rubber cushioning element omitted.

Figure 4 is a perspective view of one of the units of the series which form the cushioning element of the mechanism.

Figure 5 is a longitudinal sectional view corresponding substantially to the line 5—5 of Figure 6, taken on two intersecting planes at 120° apart, illustrating another embodiment of the invention.

Figure 6 is a front elevational view of Figure 5, looking from left to right.

Figure 7 is a side elevational view of one of the friction shoes of the mechanism illustrated in Figure 5.

Figure 8 is a front end elevational view of the cushioning element shown in Figure 5.

Referring first to the embodiment of the invention illustrated in Figures 1 to 4 inclusive, my improved shock absorbing mechanism comprises broadly a friction casing A, a pair of friction shoes B—B, and a rubber cushioning element C.

The casing A is in the form of a tubular member of rectangular transverse cross section, open at its front end and closed at the rear end by a transverse wall 11. At the open end thereof, the casing A presents opposed, interior friction surfaces 12—12 formed on the opposed side walls thereof, which are indicated by 13—13. As shown, the walls 13—13 are thickened at the front end portions of the casing and the opposed friction surfaces 12—12 of said thickened wall portions converge inwardly toward the rear of the casing, thus forming a friction shell section. Interiorly of the casing, extending from the rear wall 11 thereof, is an inward hollow centering projection 14 of V-shaped, horizontal, transverse cross section, presenting flat abutment faces 15—15, which converge forwardly and meet at the longitudinal central axis of the casing. At the open front ends, outwardly beyond the friction surfaces 12—12, the opposed side walls 13—13 of the casing are provided with inturned stop flanges or lugs 16—16 for restricting outward movement of the shoes B—B, as hereinafter pointed out.

The friction shoes B—B are in the form of blocks and are arranged within the open end of the casing A at opposite sides of the same. Each shoe B has a rearwardly facing, flat wedge face 17 on its inner side, and a lengthwise extending, flat friction surface 18 on its outer side. The friction surfaces 18—18 of the shoes B—B engage the friction surfaces 12—12 of the casing, being correspondingly inclined thereto. The wedge faces 17—17 of the two shoes B—B are at the rear end portions thereof and converge forwardly of the mechanism, and are correspondingly inclined to the faces 15—15 of the projection 14 at the rear end of the casing. Each shoe B is of reduced thickness at the forward end portion thereof, that is, forwardly of the friction surface 18, thus providing a transverse stop shoulder 19 which is engaged in back of the lug 16 at the corresponding side of the casing to positively limit outward movement of the shoe. At the forward ends, the shoes B—B present flat transverse faces 20—20 adapted to cooperate with the usual front follower of the draft rigging of a railway car to receive the actuating force.

The rubber cushioning element C is disposed within the casing A between the projection 14 and the shoes B—B, and comprises a plurality of nested units 21—21 arranged in series. As shown most clearly in Figures 1 and 4, each unit 21 comprises front and rear metal plates 22 and 23 of V-shaped, transverse cross section and an interposed rubber mat 24 also of V-shaped cross section, the mat 24 being vulcanized to these plates. As further shown in Figures 1 and 4, the exposed side edges of the rubber mats 24 are indented, as indicated at 25, so that when the mats are flattened out under compression the edges of the mats will not bulge beyond the edges of the metal plates. The sides of the V-shaped metal plates 22 and 23 and of the rubber mat 24 of each unit are correspondingly inclined to the faces 17—17 of the shoes B—B and the faces 15—15 of the centering projection 14. As shown in Figure 1, the rubber units 21—21 interfit in their nested condition when assembled within the casing, with the front and rear plates 22 and 23 of adjacent units bearing on each other, the rear plate 23 of the rearmost unit 21 bearing on the faces 15—15 of the centering projection 14, and the front plate 22 of the unit 21 at the front end of the series bearing on the wedge faces 17—17 of the shoes. As will be evident, the rubber cushioning element C is thus, in effect, an elastic wedge member having forwardly converging wedge faces 26—26 at its forward end, presented by the front plate 22 of the unit 21 at the forward end of the series of units. In the assembled condition of the mechanism, the units 21—21 are preferably placed under initial compression.

The operation of the improved shock absorbing mechanism shown in Figures 1 to 4 inclusive is as follows: Upon the mechanism being compressed, the shoes B—B are forced inwardly or rearwardly of the casing A against the resistance of the rubber cushioning element C. During this action, the shoes B—B are spread apart into tight frictional contact with the friction surfaces 12—12 of the casing A by the wedging action of the inclined faces 26—26 of the front plate 22 of the element C. Combined frictional and cushioning resistance is thus provided during the compression stroke of the mechanism by sliding movement of the shoes B—B on the friction surfaces 12—12 of the casing A and by compression and distortion of the rubber mats 24—24 of the cushioning element C, the mats 24—24 being also subjected to shearing stresses during compression between the plates 22—23 of the units 21—21.

Upon the actuating force being removed, the tendency of the rubber mats to expand, while returning to their normal shape, restores all of the parts to the normal full release position shown in Figure 1, outward movement of the shoes B—B being arrested by engagement of the shoulders 19—19 thereof with the stop lugs 16—16 of the casing A.

Referring next to the embodiment of the invention illustrated in Figures 5 to 8 inclusive, my improved shock absorbing mechanism comprises broadly a friction casing D, three friction shoes E—E—E, and a rubber cushioning element F.

The casing D is of substantially hexagonal, transverse cross section, open at its front end and closed at its rear end by a transverse vertical wall 31. At the open end, the casing is provided with three interior, inwardly converging friction surfaces 32—32—32 of V-shaped, transverse cross section. Interiorly of the casing D, projecting from the rear wall 31, is an inwardly extending, hollow centering projection 33, which is in the form of a triangular pyramid and presents flat abutment faces 34—34—34 which converge forwardly and meet at the longitudinal central axis of the casing. At the open front end, outwardly beyond the friction surfaces 32—32—32, the walls of the casing at the corners of the intersections of the V-shaped surfaces 32—32—32, are provided with inturned webs or stop lugs 35—35—35, which are engaged by abutment shoulders 36—36—36 on the shoes E—E—E to limit outward movement of the shoes.

The friction shoes E—E—E are disposed within the open front end of the casing and are arranged symmetrically about the central longitudinal axis thereof. Each shoe E has a friction surface 37 of V-shaped, transverse cross section on its outer side engaging the corresponding V-shaped surface 32 of the casing D, and a flat rearwardly facing wedge face 38 on its inner side bearing on the rubber cushioning element F. The wedge faces 38—38—38 of the three shoes E—E—E converge forwardly toward the central longitudinal axis of the casing D and are correspondingly inclined to the faces 34—34—34 of the projection 33 on the rear wall 31 of the casing. At the outer end, each shoe presents a flat transverse abutment face 39, adapted to receive the actuating force.

The rubber cushioning element F is disposed within the casing D between the projection 33 and the shoes E—E—E, and comprises a plurality of units 40—40—40 arranged in series. As shown most clearly in Figures 5 and 8, each unit 40 comprises front and rear metal plates 41 and 42, each in the shape of a triangular hollow pyramid, and an interposed rubber mat 43 also in the shape of a triangular hollow pyramid, the mat 43 being vulcanized to these plates. The exposed edges of the rubber mat 43 are indented, as indicated at 44, so that the mat will not bulge beyond the edges of the plates of the unit, when compressed. The three sides of the plates 41 and 42 and of the rubber mat 43 are correspondingly inclined to the faces 38—38—38 of the shoes E—E—E and the faces 34—34—34 of the centering projection 33. As shown in Figure 5, the units 40—40 interfit in their nested condition, when assembled within the casing D, with the front and rear plates 41 and 42 of adjacent units bearing on each other, the rear plate 42 of the rearmost unit 40 bearing on the faces 34—34—34 of the centering projection 33, and the front plate 41 of the unit 40 at the front end of the series bearing on the wedge faces 38—38—38 of the shoes. As will be evident, the rubber cushioning element F is, in effect, a wedge member having forwardly converging wedge faces 45—45—45 at its forward end presented by the front plate 41 of the unit 40 at the forward end of the series. The units 40—40 of the rubber cushioning element F are preferably under a predetermined amount of initial compression in the assembled condition of the mechanism.

The operation of the mechanism illustrated in Figures 5 to 8 inclusive is substantially the same as the operation of the mechanism illustrated in Figures 1 to 4 inclusive and needs no further detailed description.

I claim:

1. In a friction shock absorbing mechanism, the combination with a friction casing having a closed rear end and interior friction surfaces adjacent its open front end; of friction shoes telescoped within the casing in sliding engagement with the friction surfaces thereof, said shoes having forwardly converging wedge faces on their inner ends; and a yielding cushioning element within the casing bearing on said closed end and on said shoes, said element including a plurality of units arranged in series, each unit comprising front and rear spacing plates and a rubber mat interposed between and bonded to said plate, said front and rear spacing plates and mat of each unit having forwardly converging side portions, said plates and mat of each unit interfitting in nested relation, said units also interfitting in nested relation with each other, and the converging side portions of the front plate of the front unit being engaged between the forwardly converging wedge faces of said shoes.

2. In a friction shock absorbing mechanism, the combination with a friction casing having interior friction surfaces; of friction shoes telescoped within the casing in sliding engagement with the friction surfaces thereof, said shoes having forwardly converging wedge faces on their inner sides; a yielding cushioning element within the casing bearing on said shoes, said element including a plurality of units arranged in series, each unit comprising front and rear spacing plates and an interposed rubber mat, said front and rear spacing plates and mat of each unit having forwardly converging side portions, said front and rear spacing plates and mat of each unit interfitting in nested relation, said units also interfitting in nested relation with each other, and the converging side portions of the front plate of the front unit being engaged between the forwardly converging wedge faces of said shoes; and a wedge-shaped centering projection on said casing engaging between the converging side portions of the rear plate of the rear unit of said series.

3. In a friction shock absorbing mechanism, the combination with a friction casing having a closed rear end and a pair of opposed, interior friction surfaces adjacent its open front end; of a pair of opposed friction shoes telescoped within the casing in sliding engagement with the friction surfaces thereof, said shoes having wedge faces at their inner ends, and a yielding element within the casing bearing on said closed rear end and on said shoes, said element including a unit comprising front and rear spacing plates of V-shaped, transverse cross section and a rubber mat of V-shaped, transverse cross section interposed between and bonded to said plates, said V-shaped front spacing plate of said unit having wedging engagement between the wedge faces of said shoes.

4. In a friction shock absorbing mechanism, the combination with a friction casing having a closed rear end and interior friction surfaces adjacent its open front end; of three friction shoes telescoped within the casing in sliding engagement with the friction surfaces thereof, said shoes having wedge faces at their inner ends; and a yielding element within the casing bearing on said closed end and on said shoes, said element including a unit comprising front and rear spacing plates of hollow, triangular pyramidal form, and a rubber mat of hollow triangular pyramidal form interposed between and bonded to said plates, said front spacing plate of hollow triangular pyramidal form having wedging engagement between the wedge faces of the three shoes.

5. In a friction shock absorbing mechanism, the combination with a friction casing having a closed rear end and interior friction surfaces adjacent its open front end; of friction shoes telescoped within the casing in sliding engagement with the friction surfaces thereof; and a yielding cushioning element within the casing bearing on said closed end of the casing and on said shoes, said element including a spacing plate having forwardly converging sides which are engaged with forwardly converging wedge faces on the rear ends of said shoes.

6. In a friction shock absorbing mechanism, the combination with a friction casing having a closed rear end and interior friction surfaces adjacent its open front end; of friction shoes telescoped within the casing in sliding engagement with the friction surfaces thereof; and a yielding cushioning element within the casing bearing on said closed end and on said shoes, said element including a unit comprising front and rear spacing plates having forwardly converging side portions and a rubber mat interposed between and bonded to said plates, said converging side portions of said front spacing plate engaging forwardly converging wedge faces on the rear ends of said shoes.

7. In a friction shock absorbing mechanism, the combination with a friction casing having a closed rear end and interior friction surfaces adjacent its open front end; of friction shoes telescoped within the casing in sliding engagement with the friction surfaces thereof, said shoes having forwardly converging wedge faces on their inner ends; and a yielding cushioning element within the casing bearing on said closed end and on said shoes, said element including a plurality of units arranged in series, each unit comprising front and rear spacing plates of V-section and a rubber mat interposed between and bonded to said plates, said spacing plates each having forwardly converging sides forming a wedge projection, said wedge projection of the front unit of said series being engaged between said wedge faces on said shoes.

References Cited in the file of this patent

UNITED STATES PATENTS

| | | |
|---|---|---|
| 2,216,429 | Blomberg | Oct. 1, 1940 |
| 2,506,707 | Dath | May 9, 1950 |
| 2,565,650 | Dath | Aug. 28, 1951 |
| 2,588,488 | Dath | Mar. 11, 1952 |
| 2,641,463 | Mulcahy | June 9, 1953 |